United States Patent
Choi

(10) Patent No.: US 12,391,262 B2
(45) Date of Patent: Aug. 19, 2025

(54) SYSTEM AND METHOD FOR CONTROLLING VEHICLE

(71) Applicants: HYUNDAI MOTOR COMPANY, Seoul (KR); Kia Corporation, Seoul (KR)

(72) Inventor: Byoung Il Choi, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 740 days.

(21) Appl. No.: 17/584,649

(22) Filed: Jan. 26, 2022

(65) Prior Publication Data

US 2022/0402511 A1    Dec. 22, 2022

(30) Foreign Application Priority Data

Jun. 17, 2021   (KR) .................. 10-2021-0078830

(51) Int. Cl.
    *B60W 50/02*    (2012.01)
    *G07C 5/08*    (2006.01)

(52) U.S. Cl.
    CPC ....... *B60W 50/0205* (2013.01); *G07C 5/0808* (2013.01); *B60W 2050/021* (2013.01); *B60W 2556/10* (2020.02); *B60W 2556/45* (2020.02); *G07C 5/0841* (2013.01)

(58) Field of Classification Search
    CPC ....... B60W 50/0205; B60W 2050/021; B60W 2556/10; B60W 2556/45; G07C 5/0833; G07C 5/0841; G07C 5/00808; G05B 19/418; G05B 19/41857; G01M 17/00

USPC .................................... 700/709–710
    See application file for complete search history.

(56) References Cited

U.S. PATENT DOCUMENTS

| 11,706,283 B2* | 7/2023 | Sugimoto ............. G06F 9/5027 709/201 |
| 11,768,485 B2* | 9/2023 | Choi ................ G05B 19/41875 700/109 |
| 12,288,429 B2* | 4/2025 | Choi ...................... G07C 5/085 |

(Continued)

FOREIGN PATENT DOCUMENTS

| CN | 103838226 B | * | 8/2016 | ............. G05B 23/02 |
| CN | 114625100 A | * | 6/2022 | ......... G05B 23/0262 |

(Continued)

OTHER PUBLICATIONS

An English translated-version of CN109033338A (Liu Shang of Beijing Electric Vehicle Co.*

(Continued)

*Primary Examiner* — Cuong H Nguyen
(74) *Attorney, Agent, or Firm* — MORGAN, LEWIS & BOCKIUS LLP

(57) ABSTRACT

A system for controlling a vehicle includes a terminal that collects at least one of a fault code of at least one controller of the vehicle, operation state data of the vehicle at a time the fault code is generated, and update data of the at least one controller, and a server that receives at least one of the fault code, the operation state data, or the update data of the at least one controller, in which the server labels fault code differently to classify the fault code depending on whether there is an update history of the at least one controller in which the fault code is generated.

18 Claims, 9 Drawing Sheets

(56) References Cited

U.S. PATENT DOCUMENTS

| | | | | |
|---|---|---|---|---|
| 2011/0258044 | A1* | 10/2011 | Kargupta | G06Q 30/0251 |
| | | | | 705/14.49 |
| 2022/0180674 | A1* | 6/2022 | Choi | G07C 5/008 |
| 2022/0402511 | A1* | 12/2022 | Choi | B60W 50/0205 |
| 2023/0045203 | A1* | 2/2023 | Lei | G06F 8/71 |

FOREIGN PATENT DOCUMENTS

| | | | | | |
|---|---|---|---|---|---|
| CN | 116386167 | A | * | 7/2023 | G07C 5/0808 |
| KR | 20190093765 | A | * | 8/2019 | B60W 30/14 |
| KR | 20220048173 | A | * | 4/2022 | B60W 50/0205 |
| KR | 20220168841 | A | * | 12/2022 | G07C 5/0808 |
| KR | 20220169665 | A | * | 12/2022 | B60W 50/0205 |

OTHER PUBLICATIONS

An English translated-version of CN111414477B (Lei et al. US Publication 20230045203-A1).*
An English translated-version of CN103838226B (Zhu et al.).*
An English translated-version of KR200190093765A (Lee et al. ).*
Salih, Saif, and Richard Olawoyin. "Fault injection in model-based system failure analysis of highly automated vehicles." IEEE Open Journal of Intelligent Transportation Systems 2 (2021): 417-428. (Year: 2021).*
Zhang, Qingzhao, et al. "A systematic framework to identify violations of scenario-dependent driving rules in autonomous vehicle software." Proceedings of the ACM on Measurement and Analysis of Computing Systems 5.2 (2021): 1-25. (Year: 2021).*
Santos, Francisco José Rodrigues dos. An abstract of Fleet Management System. pp. 1-3 MS thesis. 2021. (Year: 2021).*
Dawam, Edward Swarlat. "Improvements to the operation of autonomous vehicles (AVs) in Smart Cities." (2021). (Year: 2021).*

* cited by examiner

SYSTEM AND METHOD FOR CONTROLLING VEHICLE

CROSS-REFERENCE TO RELATED APPLICATION

This application claims the benefit of priority to Korean Patent Application No. 10-2021-0078830, filed on Jun. 17, 2021 in the Korean Intellectual Property Office, the entire contents of which are incorporated herein by reference.

TECHNICAL FIELD

The present disclosure relates to a system and a method for controlling a vehicle.

BACKGROUND

Recently, as autonomous driving technology, connectivity technology, and the like are applied to a vehicle, various controllers have been added. Such controllers are cooperatively controlled with each other through various communication schemes rather than operating individually.

However, as the complexity of a controller increases, errors and failures of the controller have frequently occurred. In particular, when an error or failure of the controller occurs, the failure history management is performed offline, so there is a limit that a human error may occur. This threatens not only the driving of the vehicle but also the safety of the occupants, so there is a need to develop a technology capable of systemically processing the error or failure history of the controller.

SUMMARY

The present disclosure has been made to solve the above-mentioned problems occurring in the prior art while advantages achieved by the prior art are maintained intact.

An aspect of the present disclosure provides a vehicle and a method for controlling a vehicle in which the history management of a failure or error of a controller can be systemically processed through wireless communication rather than offline.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a system for controlling a vehicle includes a terminal that collects at least one of a fault code of at least one controller of the vehicle, operation state data of the vehicle at a time the fault code is generated, or update data of the at least one controller, and a server that receives at least one of the fault code, the operation state data, or the update data of the at least one controller, in which the server labels fault codes differently to classify the fault code depending on whether there is an update history of the at least one controller in which the fault code is generated.

The terminal may collect the fault code, the operation state data, and the update data of the at least one controller when a collection condition preset by a user is satisfied.

The server may label the fault codes differently depending on whether the fault code is generated before the at least one controller is updated when there is the update history of the at least one controller in which the fault code is generated.

The server may label the fault codes differently depending on whether there is a history of generating the fault code that is equal to the fault code before the fault code is generated in the at least one controller when there is no update history of the at least one controller in which the fault code is generated.

The server may determine whether update information of the at least one controller is stored and whether the operation state data at the time the fault code is generated matches a failure code generation condition when there is the update history of the at least one controller in which the fault code is generated.

The server may analyze a text included in a database of the fault code and an update database of the at least one controller, and calculate a probability value indicating a similarity of the text, when the update information is stored and the operation state data at the time the fault code is generated match the fault code generation condition.

The server may label the fault code differently depending on whether the probability value exceeds a reference value.

The server may label the fault code such that it is determined that the fault code is generated due to an update of the at least one controller when the probability value exceeds the reference value.

The server may label the fault code such that it is determined that the fault code is generated after the at least one controller is updated when the probability value is less than or equal to the reference value.

According to an aspect of the present disclosure, a method of controlling a vehicle includes collecting at least one of a fault code of at least one controller of the vehicle, operation state data of the vehicle at a time the fault code is generated, or update data of the at least one controller, and receiving at least one of the fault code, the operation state data, or the update data of the at least one controller, and labelling fault code differently to classify the fault code depending on whether there is an update history of the at least one controller in which the fault code is generated.

The collecting of the fault code may include collecting the fault code, the operation state data, and the update data of the at least one controller when a collection condition preset by a user is satisfied.

The labelling of the fault code may include determining whether the fault code is generated before the at least one controller is updated when there is the update history of the at least one controller in which the fault code is generated, and labelling the fault codes differently depending on whether the fault code is generated before the update of the at least one controller.

The labelling of the fault code may include determining whether there is a history of generating the fault code that is equal to the fault code before the fault code is generated in the at least one controller when there is no update history of the at least one controller in which the fault code is generated, and labelling the fault code differently depending on whether there is the history of generating the fault code that is equal to the fault code before the fault code is generated in the at least one controller.

The labelling of the fault code may include determining whether update information of the at least one controller is stored and whether the operation state data at the time the fault code is generated matches a failure code generation condition when there is the update history of the at least one controller in which the fault code is generated.

The labelling of the fault code may include analyzing a text included in a database of the fault code and an update database of the at least one controller, and calculating a probability value indicating a similarity of the text, when the update information is stored and the operation state data at the time the fault code is generated match the fault code generation condition.

The labelling of the fault code may include labelling the fault code differently depending on whether the probability value exceeds a reference value.

The labelling of the fault code may include labelling the fault code such that it is determined that the fault code is generated due to an update of the at least one controller when the probability value exceeds the reference value.

The labelling of the fault code may include labelling the fault code such that it is determined that the fault code is generated after the at least one controller is updated when the probability value is less than or equal to the reference value.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
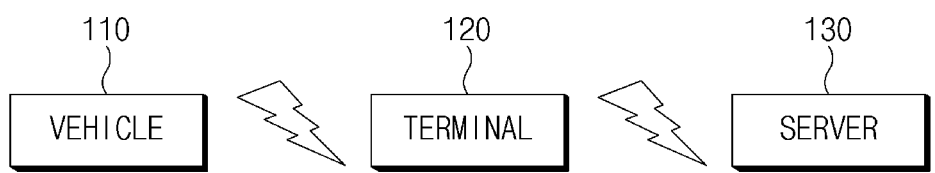
FIG. 1 is a view illustrating the configuration of a system for controlling a vehicle according to an exemplary embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a view illustrating the configuration of a system for controlling a vehicle according to an exemplary embodiment of the present disclosure.

As shown in FIG. 1, a system 100 for controlling a vehicle according to the present disclosure may include a vehicle 110, a terminal 120, and a server 130.

The driving of the vehicle 110 may be controlled by an operation of at least one controller. According to an exemplary embodiment of the present disclosure, personal mobility may be applied to the vehicle 110, where the personal mobility may include a shared electric kickboard, a shared bicycle, and the like. The vehicle 110 may generate operation state data, a fault code of the controller, and update data of the controller. The vehicle 110 will be described in more detail with reference to FIG. 2.

The terminal 120 may collect data generated in the vehicle 110. According to an exemplary embodiment, the terminal 120 may receive data by communicating with the vehicle 110 in a wired or wireless manner. According to an exemplary embodiment of the present disclosure, the terminal 120 may collect data from the vehicle 110 when a collection condition preset by a user is satisfied. In addition, the terminal 120 may communicate with the server 130 in a wireless manner to transmit data to the server 130. The terminal 120 will be described in more detail with reference to FIG. 3.

However, means for collecting the data of the vehicle 110 and transmitting the data of the vehicle 110 to the server 130 is not limited to the terminal 120. According to an exemplary embodiment of the present disclosure, data may be transmitted or received by wirelessly communicating with the server 130 through a control device or a communication device (gateway) separately provided in the vehicle 110.

The server 130 may receive data of the vehicle 110 collected by the terminal 120 through wireless communication with the terminal 120. In addition, the server 130 may label fault codes differently such that the fault code is classified depending on whether there is an update history of the controller in which the fault codes are generated. The server 130 will be described in more detail with reference to FIG. 4.

However, means for labeling the fault code is not limited to the server 130. According to an exemplary embodiment of the present disclosure, the fault code may be labeled by a control device or a communication device (gateway) separately provided in the terminal 120 or the vehicle 110.

Figure 2:
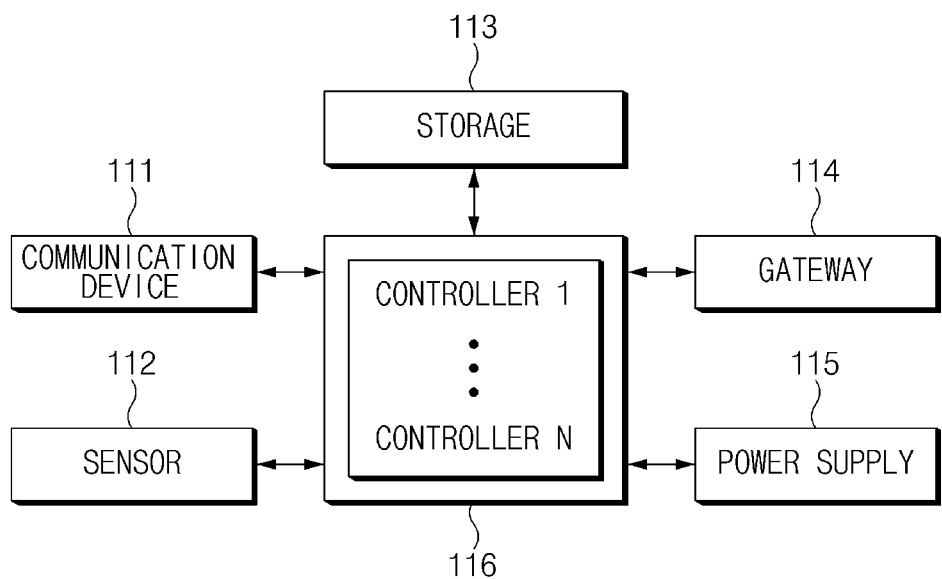
FIG. 2 is a view illustrating the configuration of a vehicle according to an exemplary embodiment of the present disclosure.

FIG. 2 is a view illustrating the configuration of a vehicle according to an exemplary embodiment of the present disclosure.

As shown in FIG. 2, the vehicle 110 according to an exemplary embodiment of the present disclosure may include a communication device 111, a sensor 112, storage 113, a gateway 114, a power supply 115, and a processor 116.

The communication device 111 of the vehicle 110 may control communication with the terminal 120 and the server 130 or control communication inside the vehicle 110. According to an exemplary embodiment, the communication device 111 may communicate with the terminal 120 and the server 130 in various wireless communication schemes such as Wi-Fi, WiBro, global system for mobile communication (GSM), code division multiple access (CDMA), wideband code division multiple access (WCDMA), universal mobile telecommunication system (UMTS), time division multiple access (TDMA), long term evolution (LTE), and the like. However, the embodiment is not limited thereto, and the communication device 111 may perform wired communication when communicating with the terminal 120.

The sensor 112 of the vehicle 110 may obtain the operation state data of the vehicle 110 when the fault code is generated. According to an exemplary embodiment, the sensor 112 may include a collision sensor, a wheel sensor, a speed sensor, an inclination sensor, a weight sensor, a heading sensor, a yaw sensor, a gyro sensor, a position module, a vehicle forward/reverse sensor, a battery sensor, a fuel sensor, a tire sensor, a steering sensor by handle rotation, a vehicle interior temperature sensor, a vehicle interior humidity sensor, an ultrasonic sensor, a illumination light sensor, a radar, a lidar, an accelerator pedal sensor, a pressure sensor, an engine speed sensor, an air flow sensor (AFS), an intake air temperature sensor (ATS), a water temperature sensor (WTS), a throttle position sensor (TPS), a TDC sensor, a crank angle sensor (CAS), and the like.

The storage 113 of the vehicle 110 may store at least one algorithm for performing calculation or execution of various commands for the operation of the vehicle 110 according to an exemplary embodiment of the present disclosure. The storage 113 may include at least one storage medium of a flash memory, a hard disk, a memory card, a read-only memory (ROM), a random access memory (RAM), an electrically erasable programmable read-only memory (EEPROM), a programmable ROM (PROM), a magnetic memory, a magnetic disk, or an optical disk.

The gateway 114 of the vehicle 110 may route communication (e.g., CAN communication, Ethernet communication, and the like) between different domains in the internal communication of the vehicle 110, and may be combined with external communication for wired/wireless communication. According to an exemplary embodiment of the present disclosure, the gateway 114 may perform the operation of the terminal 120. When the gateway 114 performs the operation of the terminal 120, the terminal 120 may not collect the fault code of the controller, the operation state data, and the update data of the controller from the vehicle 110. In addition, the gateway 114 may perform an operation of the server 130. When the gateway 114 performs the operation of the server 130, the server 130 may not perform the labeling operation of the fault code.

The power supply 115 of the vehicle 110 may supply power required for the operation of the processor 116 and the driving of the vehicle 110.

The processor 116 of the vehicle 110 may be implemented by various processing devices such as a microprocessor in which a semiconductor chip capable of performing operations or execution of various commands is embedded, and may control the operations of the vehicle 110 according to an exemplary embodiment of the present disclosure. The processor 116 of the present disclosure may include at least one controller (controller 1, . . . , controller N).

The processor 116 may proceed with the update of the controller in the startup ON or IGN ON state, and when the update is completed, may determine the failure state of the controller after restarting.

When a failure occurs in at least one controller, the processor 116 may generate a failure code and match the failure code with the operation state data at the time when the failure code is generated. In addition, the processor 116 may temporarily store the failure code and the operation state data at the time when the operation state data matched with the failure code is generated in the storage 113, and may transmit the failure code and the operation state data to the terminal 120 when receiving a reception request from the terminal 120.

In addition, the processor 116 may generate update data of at least one controller. In this case, the update data of the controller may include software version information of the controller and the update content of the controller, where the update content of the controller may include content changed in the current version of the software compared to the previous version of the software of the controller. The processor 116 may always store the update data of the controller in the storage 113, and when receiving a reception request from the terminal 120, the processor 116 may transmit the update data to the terminal 120.

According to an exemplary embodiment of the present disclosure, the processor 116 may further include a separate new controller capable of performing the operation of the terminal 120. When the new controller performs the operation of the terminal 120 according to an exemplary embodiment of the present disclosure, the terminal 120 may not collect the fault code, operation state data, and update data of the controller from the vehicle 110. In addition, the new controller may perform the operation of the server 130. When the new controller performs the operation of the server 130, the server 130 may not perform the labeling operation of the fault code.

Figure 3:
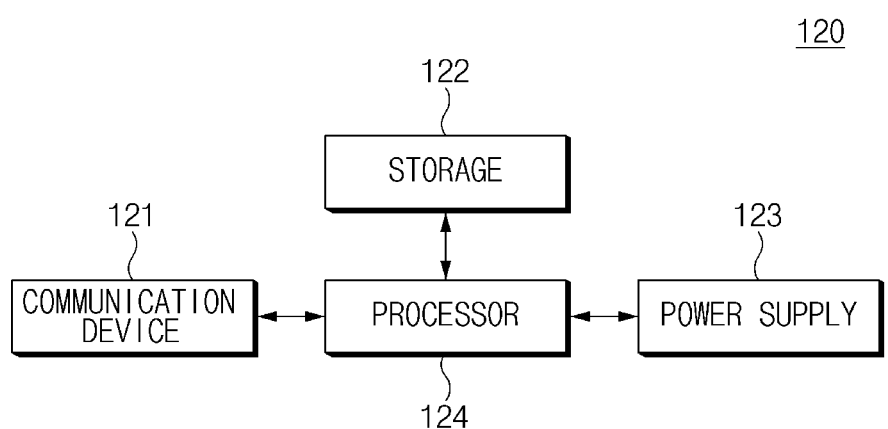
FIG. 3 is a view illustrating the configuration of a terminal according to an exemplary embodiment of the present disclosure.

FIG. 3 is a view illustrating the configuration of a terminal according to an exemplary embodiment of the present disclosure.

As shown in FIG. 3, the terminal 120 according to an exemplary embodiment of the present disclosure may include a communication device 121, storage 122, a power supply 123, and a processor 124.

The communication device 121 of the terminal 120 may communicate with the vehicle 110 and the server 130. The communication device 121 may receive the operation state data of the vehicle from the vehicle 110 through wired or wireless communication with the vehicle 110. In addition, the communication device 121 may transmit the operation state data of the vehicle received from the vehicle 110 to the server 130 through wireless communication with the server 130. According to an exemplary embodiment, the communication device 121 may perform wireless communication in various wireless communication schemes such as Wi-Fi, WiBro, global system for mobile communication (GSM), code division multiple access (CDMA), wideband code division multiple access (WCDMA), universal mobile telecommunication system (UMTS), time division multiple access (TDMA), long term evolution (LTE), and the like.

The storage 122 of the terminal 120 may store at least one algorithm for performing calculation or execution of various commands for the operation of the terminal 120 according to an exemplary embodiment of the present disclosure. The storage 122 may include at least one storage medium of a flash memory, a hard disk, a memory card, a read-only memory (ROM), a random access memory (RAM), an electrically erasable programmable read-only memory (EEPROM), a programmable ROM (PROM), a magnetic memory, a magnetic disk, or an optical disk.

The power supply 123 of the terminal 120 may supply power required for the operation of the terminal 120.

The processor 124 of the terminal 120 may be implemented by various processing devices such as a microprocessor in which a semiconductor chip capable of performing operations or execution of various commands is embedded, and may control the operations of the terminal 120 according to an exemplary embodiment of the present disclosure.

The processor 124 may collect at least one of a fault code of at least one controller, operation state data of a vehicle, or update data of the controller from the vehicle 110. According to an exemplary embodiment, when the collection condition preset by a user is satisfied, the processor 124 may collect the fault code, operation state data, and update data of the controller from the vehicle 110, and may transmit the collected data to the server 130.

According to an exemplary embodiment, when the collection conditions set by the user are the same, the processor 124 may collect the fault code of the controller, the operation state data of the vehicle, and the update data of the controller under the same collection condition. For example, when the collection condition preset by the user is to collect data every one minute elapses, the processor 124 may collect data from the vehicle 110 in units of one minute.

According to another exemplary embodiment, when the collection conditions preset by the user is different from each other according to the data to be collected, the fault code and the operation state data are collected every one minute, and the update data of the controller is collected every two minutes. When the collection condition of the update data of the controller is IGN ON or ignition ON, the processor 124 may collect the update data of the controller in the IGN ON or ignition ON state.

Figure 4:
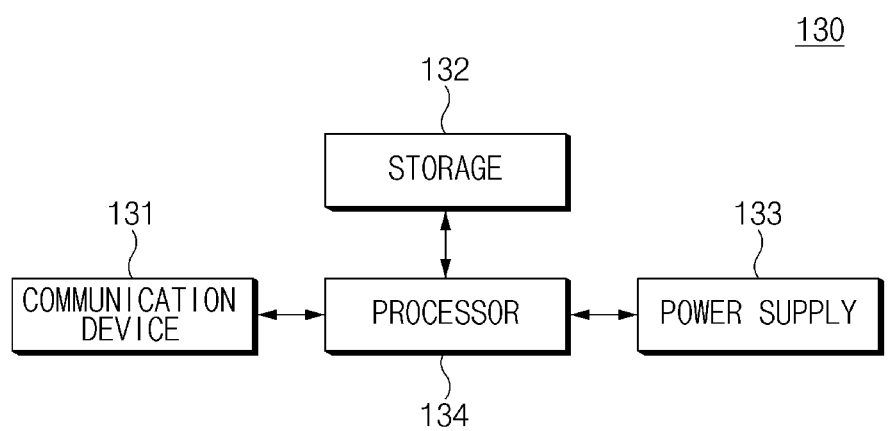
FIG. 4 is a view illustrating the configuration of a server according to an exemplary embodiment of the present disclosure.

FIG. 4 is a view illustrating the configuration of a server according to an exemplary embodiment of the present disclosure.

As shown in FIG. 4, the server 130 according to an exemplary embodiment of the present disclosure may include a communication device 131, storage 132, a power supply 133, and a processor 134.

The communication device 131 of the server 130 may communicate with the vehicle 110 and the terminal 120. According to an exemplary embodiment, the communication device 131 may wirelessly communicate with the terminal 120 when the terminal 120 collects data from the vehicle 110. According to another exemplary embodiment, the communication device 131 wirelessly communicates with the vehicle 110 when the gateway 114 of the vehicle 110 or a new processor of the separately provided in the vehicle 110 performs the operation of the terminal 120.

According to an exemplary embodiment, the communication device 131 may perform wireless communication in various wireless communication schemes such as Wi-Fi, WiBro, global system for mobile communication (GSM), code division multiple access (CDMA), wideband code division multiple access (WCDMA), universal mobile telecommunication system (UMTS), time division multiple access (TDMA), long term evolution (LTE), and the like.

The storage 132 of the server 130 may include a fault code database (DB), a vehicle-specific fault code generation history database (DB), an operation state database (DB), a controller update database (DB), and a vehicle specification database (DB). However, the embodiment is not limited thereto, and the above-described database may be provided separately from the storage 132.

The fault code database may store the fault code and fault code generation condition received from the vehicle 110 or the terminal 120. In addition, the fault code database may store a history of a fault code generated in each vehicle type or the development stage. According to an exemplary embodiment, in the fault code database, when the value of the operation state data of sensor A in the vehicle 110 exceeds '10', a message stating 'Generate a fault code P00' may be stored as a condition of generating fault code P00.

The vehicle-specific fault code generation history database may store the classification result and labeling result of the fault code of the controller generated in the vehicle.

The operation state database may store operation state data at the time of generation of the fault code of the controller.

The controller update database may store the update history of the controller and update information for each software version of the controller based on the update data of the controller received from the vehicle 110 or the terminal 120. According to an exemplary embodiment, the controller update database may store the update history of the controller classified according to the vehicle type and information (e.g., communication/control signals, parameters) changed while being updated.

The vehicle specification database may store option information according to the specification of the vehicle. For example, the vehicle specification database may include information on a controller included in option A of the vehicle and information on a controller included in option B of the vehicle.

In addition, the storage 132 may store at least one algorithm for performing calculation or execution of various commands for the operation of the server 130 according to an exemplary embodiment of the present disclosure. The storage 132 may include at least one storage medium of a flash memory, a hard disk, a memory card, a read-only memory (ROM), a random access memory (RAM), an electrically erasable PROM (EEPROM), a programmable ROM (PROM), a magnetic memory, a magnetic disk, or an optical disk.

The power supply 133 of the server 130 may supply power required for the operation of the server 130.

The processor 134 may be implemented by various processing devices such as a microprocessor in which a semiconductor chip capable of performing operations or execution of various commands is embedded, and may control the operations of the server 130 according to an exemplary embodiment of the present disclosure.

The processor 134 may receive at least one of the fault code of the controller from the vehicle 110 or the terminal 120, the operation state data at the time of generating the fault code of the vehicle 110, and the update data of the controller, and may label fault codes differently such that the fault code is classified depending on whether there is an update history of the controller in which the fault codes are generated. According to an exemplary embodiment, the processor 134 may determine whether the software version of the controller has been changed by being updated after the controller in which the fault code is generated is produced, and classify the fault code corresponding to the determination result.

According to an exemplary embodiment, when there is an update of the controller in which the fault code is generated, the processor 134 may label the fault codes differently depending on whether the fault code is generated before the update of the controller.

When there is an update of the controller in which the fault code is generated, and there is a history of generation of the fault code before the update of the controller, the processor 134 may determine that the fault code is generated even before the update of the controller and the fault code is generated even after the update. In this case, the processor 134 may perform labelling (Labeling 1) as required to review the validity of the software update of the controller.

When there is an update of the controller in which the fault code is generated, and there is no history of generation of the fault code before the update of the controller, the processor 134 may determine that the fault code is not generated before the update of the controller, but the fault code is generated after the update. In this case, the processor 134 may perform labelling (Labeling 2) as required to review the side effect of the update of the controller.

According to another exemplary embodiment, the processor 134 may label the fault codes differently depending on whether there is no update of the controller in which the fault code is generated, and there is a history in which the same fault code as the fault code is generated in the controller before the time when the fault code is generated in the controller.

When there is no update of the controller in which the fault code is generated, and there is a history in which the same fault code is generated in the controller before the time when the fault code is generated in the controller, the processor 134 may determine that the same fault code is generated in the controller even before the fault code of the controller is generated, and there is no update after the fault code is generated in the controller, so the processor 134 may perform labelling (Labeling 3) as required to determine the cause of the failure of the update.

When there is no update of the controller in which the fault code is generated, and there is no history of generating the same fault code in the controller before the time when the fault code is generated in the controller, the processor 134 may determine that the same fault code is not generated in the controller before the fault code of the controller is generated, and there is no update after the fault code of the controller is generated, so that the processor 134 may perform labelling (Labeling 4) as required to identify the cause of the failure of the update and monitor the controller.

In addition to labeling the fault codes differently such that the fault codes are classified depending on whether there is an update history of the controller in which the fault code is generated, when there is an update history of the controller (in case where the software version is changed due to the update of the controller in which the fault code is generated), the processor 134 may determine whether the update information of the controller is stored and whether the operation state data at the time the fault code is generated matches the fault code generation condition.

When the update information of the controller is stored and the operation state data at the time the fault code is generated matches the fault code generation condition, the processor 134 may analyze the text included in the fault code database and the controller update database, and calculate a probability value indicating the similarity of the text. According to an exemplary embodiment, the processor 134 may analyze the text (information changed as the controller is updated) stored in the update database of the controller and the text (fault code generation condition information of the controller) stored in the failure code database. The operations of analyzing the text and calculating the probability value indicating the similarity of the text by the processor 134 may be performed by a technique known in the art.

The processor 134 may determine whether the probability value exceeds a reference value. That is, the processor 134 may determine whether the fault code is generated due to the update of the controller.

When the probability value exceeds the reference value, the processor 134 may determine that the information changed while the controller is updated is similar to the fault code generation condition of the controller, and the fault code is generated due to the update of the controller in which the fault code is generated, and may perform labelling (Labeling A). Meanwhile, when the probability value does not exceed the reference value, the processor 134 may determine that the information changed while the controller is updated is not similar to the fault code generation condition of the controller, and the fault code is not generated due to the update of the controller in which the fault code is generated, thereby performing labelling (Labeling B). That is, the processor 134 may determine that the fault code is generated after the controller is updated, and may determine that the information changed while being updated and the fault code generation condition of the controller are irrelevant.

Figure 5:
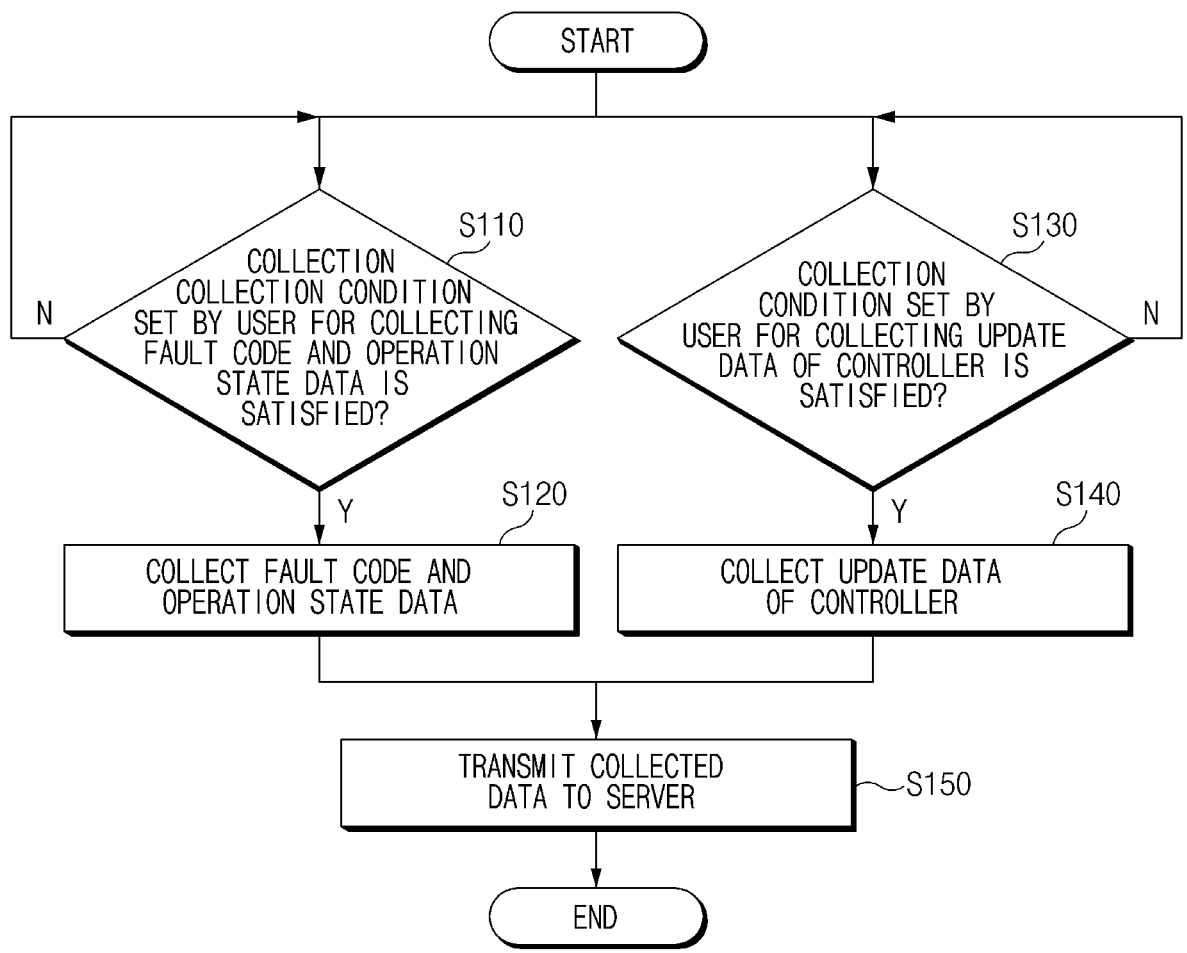
FIG. 5 is a flowchart schematically illustrating an operation of collecting vehicle data according to an exemplary embodiment of the present disclosure.

FIG. 5 is a flowchart schematically illustrating an operation of collecting vehicle data according to an exemplary embodiment of the present disclosure. The operation of collecting vehicle data according to an exemplary embodiment of the present disclosure may be performed by the terminal 120, but is not limited thereto, and may be performed by a new controller separately provided in the vehicle 110 or by a gateway of the vehicle 110. Hereinafter, an operation of collecting data from a vehicle by the terminal 120 according to an exemplary embodiment of the present disclosure will be described.

As shown in FIG. 5, when a collection condition preset by the user is satisfied, the terminal 120 may collect a fault code, operation state data, and update data of a controller from the vehicle 110. According to an exemplary embodiment, in S110, the terminal 120 may determine whether a collection condition set by the user is satisfied in order to collect the fault code and collect the operation state data at the time of generating the fault code. According to the embodiment, in S110, the terminal 120 may determine whether the time period of N minutes preset by the user has been reached.

When it is determined in S110 that the user-set collection condition for the collection of the fault code and the collection of the operation state data at the time of generating the fault code is satisfied, in S120, the terminal 120 may collect the fault code and the operation state data at the time when the fault code is generated from the vehicle 110.

In S130, the terminal 120 may determine whether the collection condition set by the user for collecting the update data of the controller is satisfied. According to the embodiment, in S130, the terminal 120 may determine whether the time period of M minutes preset by the user has been reached.

When it is determined in S130 that the user set collection condition for collecting the update data of the controller is satisfied, in S140, the terminal 120 may collect the update data of the controller from the vehicle 110.

In S150, the terminal 120 may transmit the data collected in S120 and S140 to the server.

According to another exemplary embodiment of the present disclosure, when the collection conditions set by the user in S110 and S130 are the same, for example, the collection condition set by the user is set as the ignition ON state or the ignition OFF state, the terminal 120 may integrate S110 and S130 into one operation, so that the terminal 120 may collect data from the vehicle in the case of the ignition ON state or the ignition OFF state.

Figure 6:
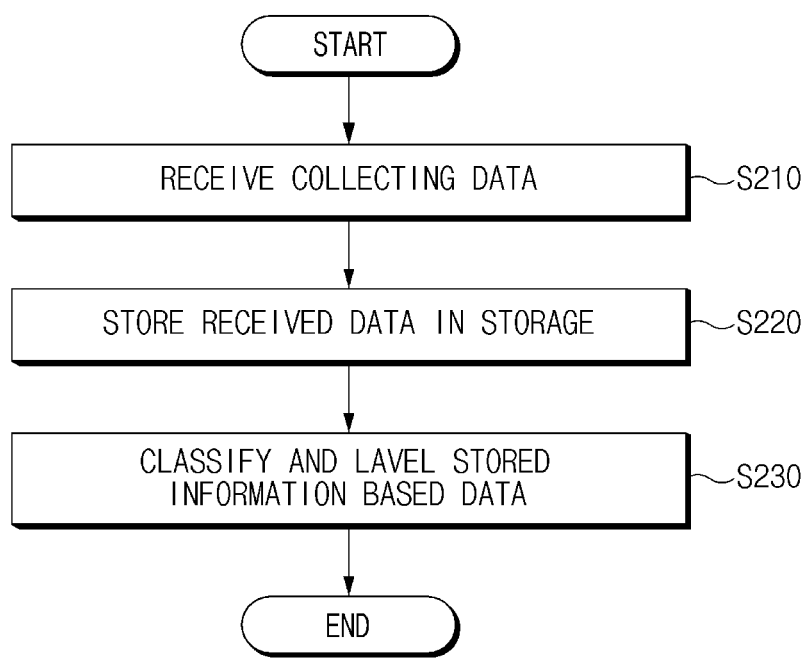
FIG. 6 is a flowchart illustrating a method of controlling a vehicle according to an exemplary embodiment of the present disclosure.

FIG. 6 is a flowchart illustrating a method of controlling a vehicle according to an exemplary embodiment of the present disclosure. The operation of controlling a vehicle according to the embodiment of the present disclosure may be performed by the server 130. However, the present disclosure is not limited to above, and the operation of controlling a vehicle may be performed by one of the terminal 120, a new controller separately provided in the vehicle 110, and a gateway of the vehicle 110. Hereinafter, an operation of controlling a vehicle by the server 130 according to an exemplary embodiment of the present disclosure will be described.

As shown in FIG. 6, in S210, the server 130 may receive collected data from the terminal 120 or the vehicle 110 (S210). In addition, in S220, the server 130 may store the received data in the storage. In S220, in addition to storing the received data in the storage, the server 130 may classify the received data according to characteristics of the received data and may distribute and store the received data in a plurality of databases.

In S230, the server 130 may classify and label data based on the stored information. The details of S230 will be described with reference to FIGS. 7 and 8.

Figure 7:
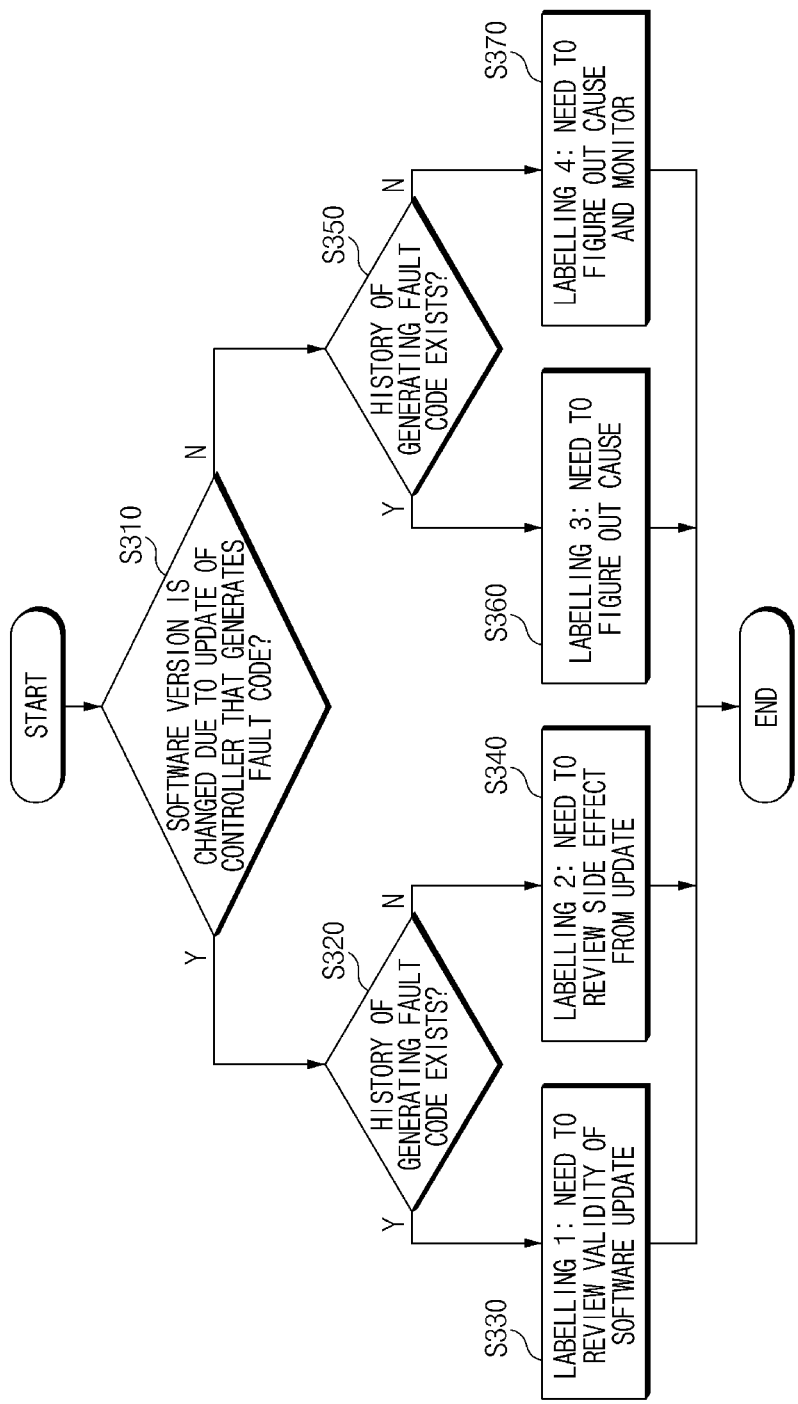
FIG. 7 is a flowchart illustrating the labeling of a fault code according to an exemplary embodiment of the present disclosure.

FIG. 7 is a flowchart illustrating the labeling of a fault code according to an exemplary embodiment of the present disclosure.

As shown in FIG. 7, the server 130 may determine whether there is an update history of the controller in which a fault code is generated. According to an exemplary embodiment, in S310, the server 130 may determine whether the software version is changed due to the update of the controller in which the fault code is generated.

When it is determined in S310 that there is an update history of the controller (Y), the server 130 may determine whether there is a history of generating a fault code before the update of the controller in S320.

When it is determined in S310 that there is the update history of the controller in which the fault code is generated (Y), and it is determined in S320 that there is the history of generating a fault code before the update of the controller (Y), the server 130 may determine that the fault code is generated even before the update of the controller and the fault code is generated even after the update. In this case, in S330, the server 130 may perform labelling (Labeling 1) to determine that it is necessary to review the validity of the software update of the controller.

When it is determined in S310 that there is the update history of the controller in which the fault code is generated (Y), and it is determined in S320 that there is no history of generating a fault code before the update of the controller (N), the server 130 may determine that the fault code is not generated before the update of the controller, but the fault code is generated after the update. In this case, in S340, the server 130 may perform labelling (Labeling 2) to determine that it is necessary to review the side effect of the update of the controller.

When it is determined in S310 that there is no update history of the controller (N), in S350, the server 130 may determine whether there is a history in which a fault code identical to the fault code is generated in the controller before the time when the fault code is generated in the controller.

When it is determined in S310 that there is no update of the controller in which the fault code is generated (N), and it is determined in S350 that there is a history in which the same fault code is generated in the controller before the time when the fault code is generated in the controller (Y), in S360, the server 130 may determine that the same fault code is generated in the controller even before the fault code of the controller is generated, and there is no update after the fault code is generated in the controller, so that the server 130 may perform labelling (Labeling 3) as required to determine the cause of the failure of the update.

When it is determined in S310 that there is no update of the controller in which the fault code is generated (N), and it is determined in S350 that there is no history of generating the same fault code in the controller before the time when the fault code is generated in the controller (N), in S370, the server 130 may determine that the same fault code is not generated in the controller before the fault code of the controller is generated, and there is no update after the fault code of the controller is generated, so that the server 130 may perform labelling (Labeling 4) as required to identify the cause of the failure of the update and monitor the controller.

Figure 8:
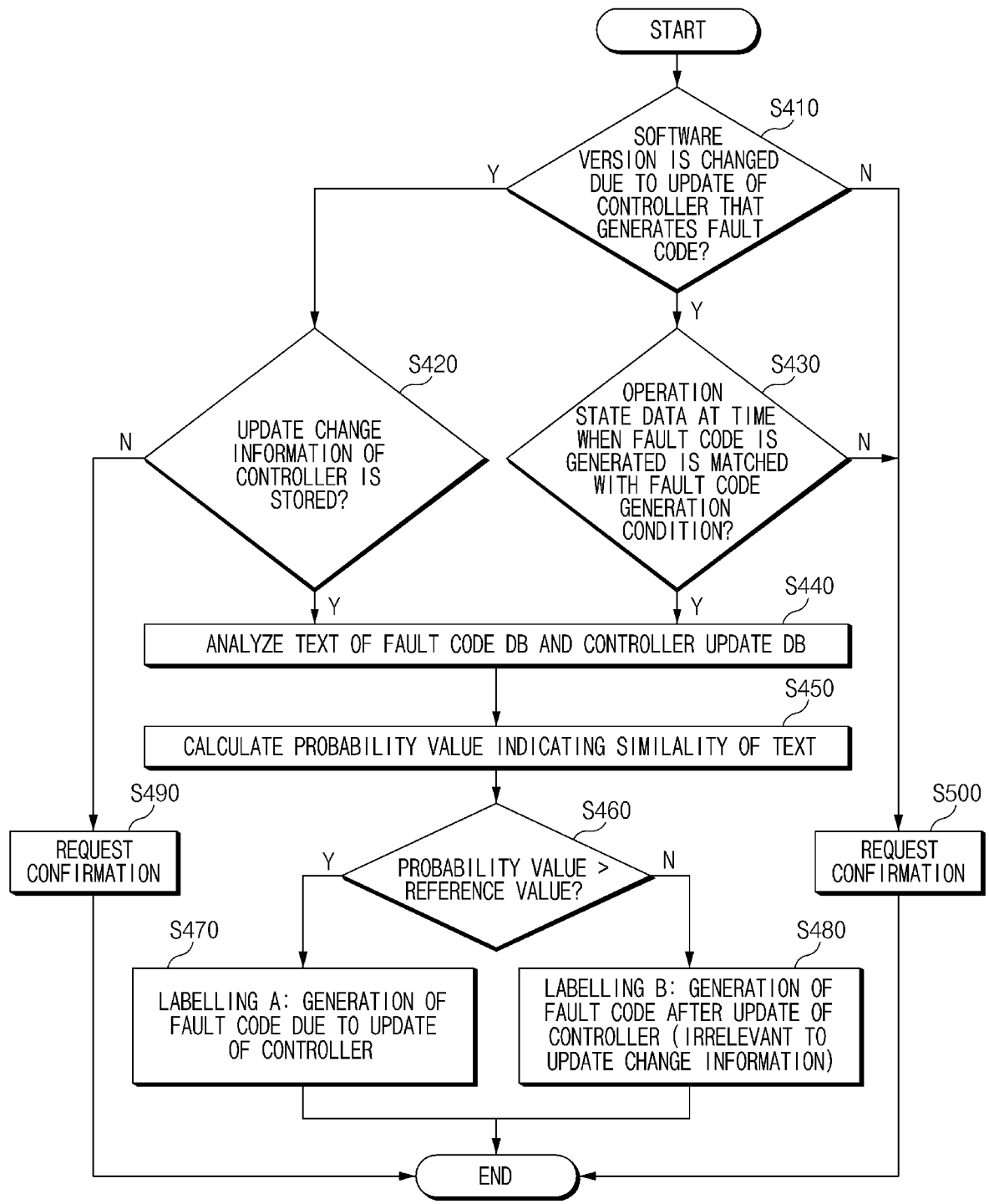
FIG. 8 is a flowchart illustrating the labeling of a fault code according to another exemplary embodiment of the present disclosure.

FIG. 8 is a flowchart illustrating the labeling of a fault code according to another exemplary embodiment of the present disclosure.

As shown in FIG. 8, the server 130 may determine whether there is an update history of the controller in which a fault code is generated. According to an exemplary embodiment, in S410, the server 130 may determine whether the software version is changed due to the update of the controller in which the fault code is generated.

When it is determined in S410 that there is an update history of the controller in which the fault code is generated (Y), the server 130 may determine whether the information changed while the controller is updated is stored in S420, and determine whether the operation state data and the fault code generation condition match at the time the fault code is generated in S430.

When it is determined in S420 that the information changed while the controller is updated is stored (Y), and it is determined in S430 that the operation state data and the fault code generation condition match at the time the fault code is generated (Y), in S440, the server 130 may analyze the text included in the fault code database and the controller update database. According to an exemplary embodiment, the server 130 may analyze the text (information changed as the controller is updated) stored in the update database of the controller and the text (fault code generation condition information of the controller) stored in the failure code database.

In S450, the server may calculate the probability value indicating the similarity of the text. The operations of calculating the probability value indicating the similarity of the text by the server 130 in S450 may be performed by a technique known in the art.

In S460, the server 130 may determine whether the probability value exceeds a reference value. In S460, the server 130 may determine whether the fault code is generated due to the update of the controller.

When it is determined in S460 that the probability value exceeds the reference value (Y), in S470, the server 130 may determine that the information changed while the controller is updated is similar to the fault code generation condition of the controller, and may perform labelling (labelling A) such that it is determined that the fault code is generated due to the update of the controller in which the fault code is generated.

Meanwhile, when it is determined in S460 that the probability value does not exceed the reference value (N), the server 130 may determine that the information changed while the controller is updated is not similar to the fault code generation condition of the controller, and may perform labelling (labelling B) such that it is determined that the fault code is not generated due to the update of the controller in which the fault code is generated. That is, the processor 134 may determine that the fault code is generated after the controller is updated, and may determine that the information changed while the controller is updated is irrelevant to the fault code generation condition of the controller.

When it is determined in S410 that there is no update history of the controller in which the fault code is generated (N), it is determined in S420 that the update change information of the controller is not stored (N), or it is determined in S430 that the operation state data at the time when the fault code is generated is not matched with the fault code generation condition (N), in S490 and S500, the server 130 may transmit a message requesting confirmation to an administrator.

Figure 9:
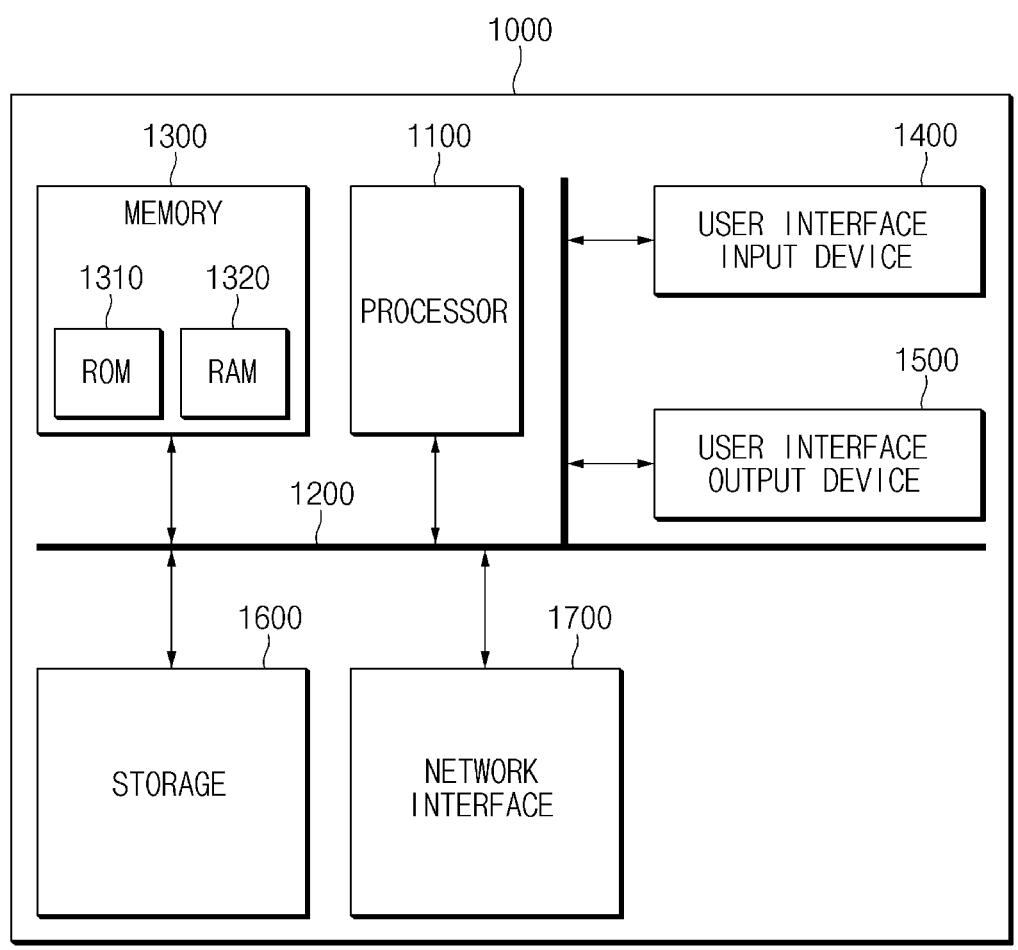
FIG. 9 is a block diagram illustrating a computing system for executing a method according to an exemplary embodiment of the present disclosure.

FIG. 9 is a block diagram illustrating a computing system for executing a method according to an exemplary embodiment of the present disclosure.

Referring to FIG. 9, a computing system 1000 may include at least one processor 1100, a memory 1300, a user interface input device 1400, a user interface output device 1500, storage 1600, or a network interface 1700 connected through a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the system and method for controlling a vehicle according to an exemplary embodiment of the present disclosure, it is possible to reduce human errors by managing the history of errors or failures of a controller by operating the system through wireless communication based on wireless communication, and easily determine the cause of the error or failure of the controller. In addition, it is possible to give priority to the resolution of the controller problem so that the error or failure of the controller may be quickly resolved.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. A system for controlling a vehicle, the system comprising:
 a terminal configured to collect at least one of a fault code of at least one controller of the vehicle, operation state data of the vehicle at a time the fault code is generated, or update data of the at least one controller; and
 a server configured to receive at least one of the fault code, the operation state data, or the update data of the at least one controller, wherein the server is further configured to label the fault code differently to classify the fault code depending on whether there is an update history of the at least one controller in which the fault code is generated,
 wherein the server determines whether software version of the at least on controller is updated, and classifies the fault code corresponding to determination result,
 wherein the system processes history management of fault code of the at least one controller so that it does not occur human error according to performing history management of fault code of at least one controller offline.

2. The system of claim 1, wherein the terminal is further configured to collect the fault code, the operation state data, and the update data of the at least one controller when a collection condition preset by a user is satisfied.

3. The system of claim 1, wherein the server is further configured to label the fault code differently depending on whether the fault code is generated before the at least one controller is updated when there is the update history of the at least one controller in which the fault code is generated.

4. The system of claim 1, wherein the server is further configured to label the fault code differently depending on whether there is a history of generating the fault code that is equal to the fault code before the fault code is generated in the at least one controller when there is no update history of the at least one controller in which the fault code is generated.

5. The system of claim 1, wherein the server is further configured to determine whether update information of the at least one controller is stored and whether the operation state data at the time the fault code is generated match a fault code generation condition when there is the update history of the at least one controller in which the fault code is generated.

6. The system of claim 5, wherein the server is further configured to analyze a text included in a database of the fault code and an update database of the at least one controller, when the update information is stored and the operation state data at the time the fault code is generated match the fault code generation condition.

7. The system of claim 6, wherein the server is further configured to label the fault code differently depending on whether the fault code is generated due to update of the at least one controller.

8. The system of claim 7, wherein the server is further configured to determine that information changed due to the update of the controller is corresponding to fault code generation condition of the controller, and to label the fault code such that the fault code is determined to be generated due to an update of the at least one controller.

9. The system of claim 7, wherein the server is further configured to determine that information changed due to the update of the controller is not corresponding to fault code generation condition of the controller, and to label the fault code such that the fault code is determined to be generated after the at least one controller is updated.

10. A method of controlling a vehicle, the method comprising:
   Collecting, by a terminal, at least one of a fault code of at least one controller of the vehicle, operation state data of the vehicle at a time the fault code is generated, and update data of the at least one controller;
   Receiving, by a server, at least one of the fault code, the operation state data, or the update data of the at least one controller, and labelling fault code differently to classify the fault code depending on whether there is an update history of the at least one controller in which the fault code is generated,
   wherein the server determines whether software version of the at least on controller is updated, and classifies the fault code corresponding to determination result,
   wherein the system, including the terminal and the server, processes history management of fault code of the at least one controller so that it does not occur human error according to performing history management of fault code of at least one controller offline.

11. The method of claim 10, wherein the collecting of the fault code includes:
   Collecting, by the terminal, the fault code, the operation state data, and the update data of the at least one controller when a collection condition preset by a user is satisfied.

12. The method of claim 10, wherein the labelling of the fault code includes:
   Determining, by the server, whether the fault code is generated before the at least one controller is updated when there is the update history of the at least one controller in which the fault code is generated; and
   Labelling, by the server, the fault code differently depending on whether the fault code is generated before the update of the at least one controller.

13. The method of claim 10, wherein the labelling of the fault code includes:
   determining, by the server, whether there is a history of generating the fault code that is equal to the fault code before the fault code is generated in the at least one controller when there is no update history of the at least one controller in which the fault code is generated; and
   labelling, by the server, the fault code differently depending on whether there is the history of generating the fault code that is equal to the fault code before the fault code is generated in the at least one controller.

14. The method of claim 10, wherein the labelling of the fault code includes:
   determining, by the server, whether update information of the at least one controller is stored and whether the operation state data at the time the fault code is generated match a fault code generation condition when there is the update history of the at least one controller in which the fault code is generated.

15. The method of claim 14, wherein the labelling of the fault code includes:
   analyzing, by the server, a text included in a database of the fault code and an update database of the at least one controller, when the update information is stored and the operation state data at the time the fault code is generated match the fault code generation condition.

16. The method of claim 15, wherein the labelling of the fault code includes:
   labelling, by the server, the fault code differently depending on whether the fault code is generated due to update of the at least one controller.

17. The method of claim 16, wherein the labelling of the fault code includes:
   determining, by the server, that information changed due to the update of the controller is corresponding to fault code generation condition of the controller, and
   labelling, by the server, the fault code such that the fault code is determined to be generated due to an update of the at least one controller.

18. The method of claim 16, wherein the labelling of the fault code includes:
   determining, by the server, that information changed due to the update of the controller is not corresponding to fault code generation condition of the controller, and
   labelling, by the server, the fault code such that the fault code is determined to be generated after the at least one controller is updated.

* * * * *